United States Patent Office 3,433,861
Patented Mar. 18, 1969

3,433,861
PRODUCTION OF DYED, SHAPED OXY-
METHYLENE POLYMERS
Robert L. Hamilton, North Plainfield, and Richard G.
Quynn, Summit, N.J., assignors to Celanese Corporation, a corporation of Delaware
No Drawing. Filed Jan. 12, 1966, Ser. No. 520,084
U.S. Cl. 264—78     9 Claims
Int. Cl. D01f 1/06

ABSTRACT OF THE DISCLOSURE

A method of improving the dye washfastness of oxymethylene polymer shaped articles comprising dyeing an undrawn article with a disperse dye and drawing the article at a temperature and draw ratio sufficient to improve the dye washfastness of the dyed shaped article.

---

This invention relates broadly to the production of shaped articles such as filamentary materials, films and the like, and more particularly is concerned with the production of dyed, shaped, oxymethylene polymers having improved properties, especially improved dye washfastness, i.e., colorfastness to washing.

Polymers having recurring —$CH_2O$-units have been known for many years. They may be prepared by the polymerization of anhydrous formaldehyde or by the polymerization of trioxane, which is a cyclic trimer of formaldehyde.

More recently novel copolymers, structurally related to polyoxymethylene, but having superior resistance to thermal degradation have become known and are being used in many different domestic and industrial applications. Such oxymethylene copolymers are more fully disclosed and are claimed in, for example, Walling et al. U. S. Patent No. 3,027,352 dated Mar. 27, 1962, assigned to the same assignee as the present invention, and which by this cross-reference is made a part of the disclosure of the instant application.

For purpose of brevity in describing the present invention homopolymeric oxymethylene and copolymers of oxymethylene wherein —$OCH_2$-groups are interspersed with other groups (as described in, for example, the aforesaid Walling et al. patent) will sometimes be collectively designated generically herein as "polyoxmet," or as "oxmet" polymer(s).

One of the major drawbacks to the use of polyoxmet as a textile fiber is its very poor washfastness. Oxmet polymers are easily melt spun and drawn to yield filamentary material having excellent tensile properties, toughness and wear resistance, and which can be readily dyed (especially with disperse dyestuffs) to heavy shades without the use of a carrier for the dye. The dyed fiber, however, has unsatisfactory washfastness. The problem of unacceptable dye washfastness is particularly acute in the case of copolymers of oxymethylene in which other groups have been introduced to improve the resistance of the polymeric material to thermal degradation.

Our studies of the mechanism of dye diffusion through polyoxmet fibers indicated that such fibers differed materially from most other fibers by having a comparatively high diffusion coefficient and low activation energy for dyeing. These values for polyoxmet fibers, and more particularly for fibers of oxymethylene copolymers, were more characteristic of the diffusion of dyestuff through water than through solid polymer; and suggested that the dyestuff entered the fiber through some internal network of cracks or cavities. It was noted that cross-sections of dyed filaments of oxymethylene copolymer were uniformly colored to the center of the fiber after short dyeing times, in contrast to the usual ring dyeing obtained when dyeing other types of fibers for similar periods of time. The use of longer dyeing periods merely raised the shade level of the uniformly dyed section of the oxymethylene copolymer filaments.

Surprisingly and unobviously it was discovered that dyeing the spun, specifically melt-spun, oxmet polymer and thereafter drawing the dyed "as-spun" fiber "locked in" the dyestuff by altering the internal network by which the dyestuff entered the fiber. For example, as-spun fibers of oxymethylene copolymer, dyed to a heavy shade with the disperse dyestuff Eastman Blue BNN (C.I. Disperse Blue 3), were drawn at 110° C. at a draw ratio of 7.5. The dyed and then drawn fibers showed excellent dye washfastness as compared with (a) undrawn, dyed fibers and with (b) fibers that had been first drawn and then dyed, the drawing and dyeing being conducted in the same way in each case.

The oxmet polymer

The polymer which is shaped, dyed and drawn (preferably hot-drawn) in practicing this invention is either homopolymeric oxymethylene or an oxymethylene copolymer that has unsatisfactory dye washfastness when dyed, e.g., with a disperse dye, by the technique previously used in dyeing such shaped polymers. Ordinarily the oxmet polymer employed is a copolymer of oxymethylene, especially oxymethylene copolymers of the kind disclosed and claimed in the aforementioned Walling et al. patent.

Thus, the oxymethylene copolymer used in carrying this invention into effect may be a polymer having a structure comprising recurring units represented by the general formula (I) 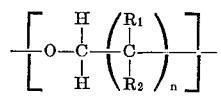

wherein each $R_1$ and $R_2$ is selected from the group consisting of hydrogen, lower alkyl and halogen-substituted lower alkyl radicals, and wherein $n$ is an integer from zero to three, inclusive, and $n$ being zero in from 85% to 99.9% of the recurring units. The oxymethylene copolymer may be defined more specifically as a normally solid, substantially water-insoluble copolymer, the repeating units of which consist essentially of (A) —$OCH_2$-groups interspersed with (B) groups represented by the general formula (II) 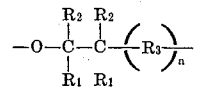

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and $n$ is an integer from zero to three, inclusive. Each lower alkyl radical preferably has from one to two carbon atoms, inclusive. The —$OCH_2$-units of (A) constitute from 85% to 99.9% of the recurring units. The units of (B) are incorporated into the copolymer during the step of copolymerization to produce the copolymer by the opening of the ring of a cyclic ether having adjacent carbon atoms by the breaking of an oxygen-to-carbon linkage.

Polymers of the desired structure may be prepared by polymerizing trioxane together with from about 0.1 to about 15 mole percent of a cyclic ether having at least two adjacent carbon atoms, preferably in the presence of a catalyst comprising a boron fluoride coordinate complex in which oxygen or sulfur is the donor atom.

In general, the cyclic ethers employed in making the oxymethylene copolymer are those represented by the general formula (III) 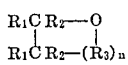

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl substituted oxymethylene radicals, and $n$ is an integer from zero to three, inclusive.

The preferred cyclic ethers used in the preparation of the oxymethylene copolymers are ethylene oxide and 1,3-dioxolane, which may be represented by the formula (IV) 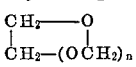

wherein $n$ represents an integer from zero to two, inclusive. Other cyclic ethers that may be employed are 1,4-dioxane, trimethylene oxide, tetramethylene oxide, pentamethylene oxide, 1,2-propylene oxide, 1,2-butylene oxide, 1,3-butylene oxide and 2,2-di-(chloromethyl)-1,3-propylene oxide.

The preferred catalysts used in preparing the oxymethylene copolymers are the aforementioned boron fluoride coordinate complexes, numerous examples of which are given in the previously identified Walling et al. patent. Reference is made to this patent for further information concerning the polymerization conditions, amount of catalyst employed, etc.

The oxymethylene copolymers produced from the preferred cyclic ethers have a structure composed substantially of oxymethylene and oxyethylene groups in a ratio of from about 6 to 1 to about 1000 to 1.

The oxymethylene copolymers which are shaped, e.g., in filamentary or film form, dyed and thereafter drawn in practicing this invention are normally solids. Their melting points range from somewhat lower than, and up to, the melting point of the corresponding oxymethylene homopolymer. The preferred copolymers have melting points not less than 150° C. In general, they have a weight loss, when maintained in an open vessel at a temperature of 225°±5° C. for 120 minutes not greater than 40 weight percent, as contrasted with oxymethylene homopolymer which has a weight loss in excess of 80 weight percent.

The shaped article, e.g., filamentary material or film, is produced from homopolymeric oxymethylene, having stabilizing end groups if desired; or from oxymethylene copolymers such as those described in the aforementioned Walling et al. patent, e.g., copolymers composed essentially of oxymethylene and oxymethylene groups, such as copolymers of trioxane with dioxolane or with ethylene oxide.

The filamentary material, film or other shaped article is generally produced by a melt-forming (e.g., melt-spinning) technique, although dry- or wet-forming methods also may be used. Usually one or more thermal stabilizers are incorporated into the polymer in order to reduce degradation during spinning or otherwise producing a shaped article. Examples of suitable stabilizers and stabilizing systems that may be employed are disclosed in Singleton's U.S. Patent No. 3,134,636 dated May 26, 1964, and assigned to the same assignee as the present invention. One suitable stabilizing system is a combination of (a) an antioxidant ingredient such as a phenolic antioxidant (e.g., a substituted bisphenol) and (b) an ingredient to inhibit chain scission, generally a compound or a polymer containing trivalent nitrogen atom(s).

A method of producing a shaped article, more particularly filamentary material comprising filaments of a high-molecular-weight oxymethylene polymer, that may be used in obtaining an as-spun material is dyed and then hot-drawn in practicing this invention is described in the aforementioned Singleton patent; and, also, in the Williams and Hudgin et al. applications referred to therein (col. 3, lines 44–48).

The undrawn, shaped article, e.g., as-spun filamentary material, is then dyed. By "undrawn," as used herein with reference to the freshly or initially formed filamentary material or other shaped article, it is meant that such material or article has not been deliberately drawn. The material is the usual product of melt-forming, specifically melt-spinning when filamentary materials are being produced, with no further processing. As such, the material has tensile properties (e.g., about 0.8 g./d. tenacity and about 900% elongation) that render it useless as a textile fiber; it must subsequently be drawn a very considerable extent in order to develop useful textile properties. The term "undrawn" implies, among other things, unoriented as well as a stress/strain curve having a characteristic shape.

If it appears to be necessary or advisable, the filamentary material may be prepared for dyeing by a preliminary scouring treatment. For this purpose one may use a hot aqueous solution of a detergent or alkali to remove soil. Such scouring agents may be, for example, a solution of trisodium phosphate or tetrasodium phosphate in a concentration of from about 1 to about 5 weight percent based on the weight of the fiber. The scouring temperature is generally between about 70° C. and about 90° C., while the scouring time is usually at least about 30 minutes.

The dyestuff employed is preferably a disperse dyestuff since, with few exceptions, other dyes give only light dyeings or stainings. The disperse dyes are generally those which are applied in the form of a dispersion in an aqueous bath. These dyes have long been applied to secondary cellulose acetate, and include materials from the classes of azo dyes, anthraquinone dyes and arylamine dyes. Specific examples of these dyes are given below:

2-nitro-4-sulfonanilido diphenylamine
4-nitro-2-methoxyphenyl azo 4'-bis(beta-hydroxyethyl) amino-2'-acetylamino benzene
4-nitro-2-methylsulfonephenyl azo 4'-(N-beta-hydroxyethyl-N-difluoroethyl)aminobenzene
4-nitro-2-chlorophenyl azo 4'-bis(beta-hydroxyethyl)amino-2'-methylbenzene
1 - hydroxyethylamino - 4 - hydroxyethylamino - 5 - hydroxy-8-hydroxy anthraquinone
1,5 - dihydroxy - 8 - nitro - 4 - (meta - alpha - hydroxyethyl)anilido anthraquinone
1,8 - dihydroxy - 4 - (para - beta - hydroxyethyl) anilido-5-nitro anthraquinone
1-amino-4-hydroxy anthraquinone
1-methylamino-4-beta-hydroxyethylamino anthraquinone Other examples of disperse dyes are given in the aforementioned Singleton patent (col. 2, lines 21–43).

The above-described disperse dyestuffs, as sold, are in the form of mixtures of a dispersing agent, e.g., sodium lignosulfonate, the sodium salt of formaldehyde-naphthalene sulfonic acid condensation product, etc., with the actual dye material. The disperse dyestuff usually contains about 30 to 45% by weight of the active dye.

Moderate to heavy dyeings are obtainable with certain basic dyes, e.g., Sevron Brilliant Red 4G (C.I. No. Basic Red 15), but the dyed polyoxmet is off-color (purple).

In the dyeing step any equipment and techniques suitable for the thorough impregnation of the filamentary material may be employed. The disperse dye is usually maintained in the dyebath in a concentration between about 0.01 and about 500 weight percent, based on the weight of the filamentary material. Between about 0.01 and 10 weight percent is preferred for a finite dyebath and between about 100 and 500 weight percent is preferred for a simulated infinite dyebath. The dyebath temperature is generally maintained between about 80° C. and about 100° C., and the residence time of the filamentary material in the dyebath is usually between about ½ hour and about 4 hours.

If desired one may include, in the dyebath, dyestuff carriers, e.g., o-phenylphenol, benzoic acid, methyl p-toluate and the like. Such carriers may be used in concentrations ranging between about 2 and about 20 weight percent, based on the weight of the fiber. Ordinarily it is not necessary to use a carrier in order to thoroughly impregnate the filamentary polyoxmet with a disperse dyestuff.

Optionally, too, suitable dispersing agents and water softeners may be added to the dyebath to promote optimum dyeing conditions. The nature and amount of such material is dependent, for example, upon the particular disperse dye employed and the hardness of the available water.

At the end of the dyeing period the excess dyestuff is removed from the filamentary material by any suitable means, e.g., by scouring, and the dyed material is dried. The dyed filamentary or other shaped, elongated article may be separately dried, or it may be dried concurrently with a subsequent hot-drawing step whereby the dye washfastness of the article is materially improved.

The dyed, shaped article in the form of mono- or multi-filaments, film, rod, tape, ribbon or other structure of continuous length is then drawn, preferably hot-drawn. Dyed structures such as films or sheets having substantial width may be biaxially drawn, using equipment now available for this purpose or modifications of such equipment.

Depending upon the particular homopolymeric or copolymeric oxymethylene employed, its melting point and other physical properties, and the particular properties other than improved dye washfastness that are desired in the final product (especially the tensile properties), the dyed shaped polymer is preferably drawn at a drawing temperature within the range of from 80° C. to 165° C., more particularly within the range of from about 105° C. to about 150° C., and at a draw ratio within the range of from 2 to 11.5, more particularly from about 4 to about 10. Stating the drawing-temperature range otherwise, it may be described as being, for example, from 0° C. (or 10° C.) to about 70° C. below the melting point of the dyed polymer.

Drawing may be effected by tensioning the filamentary or other shaped structure as it passes over a heated shoe or pin, or while it is passing over two pairs of heated, skewed rolls, the second pair of which is revolving at a higher peripheral speed than that of the first. The total overall drawing may be effected in a single stage or in a plurality of stages, i.e., two, three or more stages. As indicated hereinbefore, biaxial drawing of dyed films and the like also can be effected.

In order that those skilled in the art may better understand how the present invention can be carried into effect, the following example is given by way of illustration and not by way of limitation. All percentages are by weight unless otherwise stated.

(A) Undrawn, then dyed polyoxmet fiber

The same polyoxmet fiber from the standpoint of composition is used in the A, B and C portions of this example. It is a monofilament of a trioxane-ethylene oxide copolymer stabilized with about 0.5% of a conventional antioxidant (numerous examples of which have been given hereinbefore) and about 0.1% of a scission inhibitor, specifically cyanoguanidine. This copolymer has an inherent viscosity (I.V.) of about 1.2 (measured at 60° C. in 0.1 weight percent solution in p-chlorophenol containing 2 weight percent of alpha-pinene). The copolymer contains about 2 weight percent (about 1 mole percent) of monomeric units derived from ethylene oxide.

The filamentary material is produced by melt-spinning in essentially the same manner described in the aforementioned Singleton patent; or, as described in the Williams and Hudgin et al. applications referred to therein and to both of which reference was made in the earlier part of this specification. The resulting monofilament (approximately 110 denier) has a tenacity, before drawing, of about 0.8 g./d. and an elongation of about 875%.

Undrawn monofilament is wound from an original spinning take-up bobbin onto a perforated metal bobbin (in order to remove it smoothly and without sagging after dyeing), and dyed in that form in the manner described later in this example.

B. Dyed, then drawn polyoxmet fiber

The dyed monofilament from the A portion of this example (exclusive of that taken for tests) is drawn over a one-foot long heated metal block at 110° C. (as sensed by thermocouples positioned ⅛-inch below the surface of the block). The measured draw ratio is 7.54, and the draw-roll speed is 17.6 meters per minute.

(C) Drawn, then dyed polyoxmet fiber

Same as in the B portion of this example with the exception that the supply package for drawing is the original spinning take-up bobbin rather than a perforated bobbin. The drawn, undyed monofilament is taken up on a perforated bobbin, and dyed in that form in the manner set forth later in this example.

The dyeing of the polyoxmet fibers to which reference was made under A, B and C, supra, is carried out as follows:

A disperse dyestuff, Eastman Blue BNN (C.I. Disperse Blue 3), is used in all dyeings. The amount of dyestuff is 8% of the weight of the fiber (OWF). In each case the weight of the fiber is determined by weighing the perforated metal bobbin before and after the fiber has been wound onto it. The dyeing is carried out for 2 hours at 97° C. while the perforated bobbins having the wound fibers thereon are immersed in the dye bath. The liquor ratio is 600 to 1.

The fibers processed as described under the A, B and C portions of this example are then subjected to a 140° F. washfastness test. This test for colorfastness to washing is the same as Test No. III of Standard Test Method AATCC 36–1965 with the exception that a temperature of 140° F. is used instead of 160° F.

The results are given in Table I.

TABLE I

| Sample | Shade | Staining | | | | | | Bath |
| --- | --- | --- | --- | --- | --- | --- | --- | --- |
| | | A | C | N | S | V | W | |
| (1) Undrawn, dyed. | 2 | 1 | 5 | 1 | 2–3 | 5 | 3 | Heavy. |
| (2) Dyed, then drawn. | 4–5 | 4 | 5 | 3 | 4 | 5 | 5 | Clear. |
| (3) Drawn, then dyed. | 4 | 1–2 | 5 | 1–2 | 2–3 | 5 | 3–4 | Moderate. |

Legend.—Degree of changes indicated by International Gray Scale: 5—no change, 3—slight, 3—moderate, 2—marked, 1—severe; A—acetate, C—cotton, N—nylon, S—silk, V—viscose, W—wool.

The test for colorfastness to washing, as routinely conducted, includes the use of a so-called "stain cloth" which is subjected to the same test conditions as the sample. This stain cloth, which is a small fabric swatch, is composed of narrow woven strips (originally undyed) of various types of fibers (acetate, cotton, nylon, etc.; hence A, C, N, etc.). The purpose is to determine where the dyestuff (if it bleeds out of the test sample) migrates; that is, to determine the tendency for dye or color transference.

Thus, for the undrawn, dyed sample of (1), the test sample of polyoxmet fiber underwent a shade change of 2; that is, it underwent a marked change of color, meaning specifically that it became a much paler blue color as a result of the washfastness test. The stain cloth, at the end of the test, showed that acetate and nylon, and to a lesser extent silk and wool, picked up some of the bled-out dyestuff. The bath liquid, at the end of the test, was rated "Heavy," that is, a heavy shade of blue, showing that there was present a considerable amount of dyestuff that had bled out of the test sample and was still remaining in the bath.

The stain cloth is a fairly sensitive means for assessing colorfastness to washing. The rankings 1, 2, 3, 4 and 5, and terms "Clear," "Moderate," and "Heavy" are qualitative judgments of one who is trained and experienced in making the observations.

In addition to carrying out the above-described test, the amount of dye in each fiber before the washfastness test was determined. The results are given in Table II.

TABLE II

| Sample: | Percent dyestuff, OWF |
|---|---|
| (1) Undrawn, dyed | 1.55 |
| (2) Dyed, then drawn | 1.30 |
| (3) Drawn, then dyed | 0.88 |

When one considers the fact that sample (3) had less dyestuff to bleed out, the washfastness behavior of sample (2) as compared to sample (3) is even better than normally would be concluded from the data given in Table I. Taking into account the amount of dyestuff involved, sample (2) would be rated "excellent" in overall colorfastness to washing, while samples (1) and (3) would be rated "very poor."

From the foregoing description it will be seen that the present invention provides a method of improving useful properties including dye washfastness of a shaped article comprised of oxymethylene polymer, including the normally solid (i.e., high-molecular-weight) oxymethylene homopolymers and copolymers. The method comprises dyeing (coloring) the initially shaped article, such as an as-spun article when the shaped structure is filamentary material, with a dyeing or coloring agent, more particularly a disperse dye; and drawing the dyed, shaped article at a temperature and draw ratio sufficient to improve the dye washfastness of the dyed article. Thus, the invention provides means for improving the dye washfastness of filamentary materials which have been dyed with such disperse dyes as, for example, an azo dye, an anthraquinone dye or an arylamino dye.

It is to be understood that the foregoing detailed description is given merely by way of illustration, and that many variations may be made therein without departing from the spirit of the invention.

The embodiments of the invention in which an exclusive property or privilege is claimed are defined as follows:

1. The method of improving dye washfastness of a shaped article comprised of oxymethylene polymer which comprises dyeing the initially shaped undrawn article with a disperse dye and drawing the dyed, shaped article at a temperature of from about 105° C. to about 150° C. and a draw ratio of from about 4 to about 10 to thereby improve the dye washfastness of the dyed article.

2. The method as in claim 1 wherein the shaped article is filamentary material.

3. The method as in claim 1 wherein the shaped article is filamentary material and the disperse dye is an azo dye.

4. The method as in claim 1 wherein the shaped article is filamentary material and the disperse dye is an anthraquinone dye.

5. The method as in claim 1 wherein the shaped article is filamentary material and the disperse dye is an arylamine dye.

6. The method as in claim 1 wherein the oxymethylene polymer is a normally solid, substantially water-insoluble copolymer, the repeating units of which consist essentially of (A) —OCH$_2$— groups interspersed with groups represented by the general formula

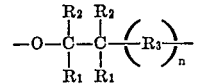

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and haloalkyl-substituted methylene, and lower alkyl and haloalkyl-substituted oxymethylene radicals, and $n$ is an integer from zero to three, inclusive, each lower alkyl radical having from one to two carbon atoms, inclusive, said (A) units constituting from 85% to 99.9% of the recurring units, said (B) units being incorporated during the step of copolymerization to produce said copolymer by the opening up of the ring of a cyclic ether having adjacent carbon atoms by the breaking of an oxygen-to-carbon linkage.

7. A method as in claim 1 wherein the oxymethylene polymer is a normally solid, substantially water-insoluble copolymer of trioxane with from about 0.1 to about 15 mole percent of a cyclic ether represented by the formula

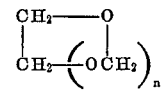

where $n$ represents an integer from zero to two, inclusive.

8. A method as in claim 7 wherein the trioxane copolymer is a normally solid, substantially water-insoluble copolymer of trioxane with from about 0.1 to about 15 mole percent of ethylene oxide.

9. A method as in claim 7 wherein the trioxane copolymer is a normally solid, substantially water-insoluble copolymer of trioxane with from about 0.1 to about 15 mole percent of dioxolane.

References Cited

UNITED STATES PATENTS

| | | | |
|---|---|---|---|
| 2,778,058 | 1/1957 | Gabler | 264—291 |
| 2,844,598 | 7/1958 | Günthard | 8—63 |
| 3,027,352 | 3/1962 | Walling | 264—176 |
| 3,134,636 | 5/1964 | Singleton | 8—55 |
| 3,241,906 | 3/1966 | Smith et al. | 264—78 |
| 3,330,897 | 7/1967 | Tessier | 264—176 |

FOREIGN PATENTS

| | | |
|---|---|---|
| 937,798 | 9/1963 | Great Britain. |
| 1,234,919 | 5/1963 | Germany. |

JULIUS FROME, Primary Examiner.

T. MORRIS, Assistant Examiner.

U.S. Cl. X.R.

8—55; 264—176, 210, 290